US011017351B2

(12) United States Patent
Sethi et al.

(10) Patent No.: US 11,017,351 B2
(45) Date of Patent: May 25, 2021

(54) PARTS RECOMMENDATION AND PROCUREMENT SYSTEM AND METHOD

(71) Applicant: Maxx Innovations, LLC, Cleveland, OH (US)

(72) Inventors: Neil Sethi, Hunting Valley, OH (US); Bryan Chaikin, Cleveland Heights, OH (US); Tom DeMille, Chagrin Falls, OH (US)

(73) Assignee: Transtar Industries LLC, Walton Hills, OH (US)

( * ) Notice: Subject to any disclaimer, the term of this patent is extended or adjusted under 35 U.S.C. 154(b) by 380 days.

(21) Appl. No.: 14/853,324

(22) Filed: Sep. 14, 2015

(65) Prior Publication Data

US 2016/0078403 A1    Mar. 17, 2016

Related U.S. Application Data

(60) Provisional application No. 62/049,769, filed on Sep. 12, 2014.

(51) Int. Cl.
*G06Q 30/06* (2012.01)
*G06Q 30/00* (2012.01)
*G06Q 10/08* (2012.01)
*G06Q 10/00* (2012.01)
*G06F 16/955* (2019.01)
*G06F 16/9535* (2019.01)

(52) U.S. Cl.
CPC ....... *G06Q 10/0875* (2013.01); *G06F 16/955* (2019.01); *G06F 16/9535* (2019.01); *G06Q 10/20* (2013.01); *G06Q 30/0635* (2013.01); *G06Q 30/00* (2013.01)

(58) Field of Classification Search
CPC ............ G06Q 30/0635; G06Q 30/0601–0645
USPC ..................... 705/26.61, 26.1–27.2
See application file for complete search history.

(56) References Cited

U.S. PATENT DOCUMENTS

| | | | |
|---|---|---|---|
| 2002/0099631 A1* | 7/2002 | Vanker | G06Q 10/087 705/28 |
| 2005/0125261 A1* | 6/2005 | Adegan | G06Q 10/06 705/4 |
| 2010/0287033 A1* | 11/2010 | Mathur | H04L 51/32 705/319 |
| 2011/0137818 A1* | 6/2011 | Goad | G06Q 30/02 705/347 |

(Continued)

OTHER PUBLICATIONS

Phil Berg, "10 Diagnostic Apps and Devices to make you a better driver" Popular Mechanics Feb. 21, 2012 (Year: 2012).*

*Primary Examiner* — Allison G Wood
*Assistant Examiner* — Jason B Warren
(74) *Attorney, Agent, or Firm* — Benesch, Friedlander, Coplan & Aronoff LLP

(57) ABSTRACT

A system and method for recommending and procuring parts to repair a malfunctioning vehicle is disclosed. A recommendation and procurement application can: take information from a vehicle's on-board diagnostic system and recommend a list of parts required to repair the malfunctioning vehicle; find the recommended parts available for purchase via the Internet; retrieve information on such recommended parts; arrange the information in a format most useable to a technician that is to repair the vehicle; and allow the technician to purchase or otherwise procure such recommended parts to facilitate repair of the malfunctioning vehicle.

20 Claims, 7 Drawing Sheets

(56) References Cited

U.S. PATENT DOCUMENTS

| | | | | |
|---|---|---|---|---|
| 2011/0258084 A1* | 10/2011 | Watts | ................ | G06Q 30/0603 |
| | | | | 705/27.1 |
| 2013/0041778 A1* | 2/2013 | Nativ | ................ | G06Q 30/0633 |
| | | | | 705/26.62 |
| 2014/0188683 A1* | 7/2014 | Cicero | ................ | G06Q 40/04 |
| | | | | 705/37 |
| 2014/0309853 A1* | 10/2014 | Ricci | ................ | G06F 9/451 |
| | | | | 701/34.4 |
| 2015/0039176 A1* | 2/2015 | Fish | ................ | G06F 1/1626 |
| | | | | 701/31.6 |
| 2015/0120484 A1* | 4/2015 | Kaganov | ................ | G06Q 30/08 |
| | | | | 705/26.3 |
| 2015/0240615 A1* | 8/2015 | Dykstra | ................ | G05D 17/02 |
| | | | | 700/275 |
| 2015/0289120 A1* | 10/2015 | Harber | ................ | H04W 4/18 |
| | | | | 455/414.3 |

* cited by examiner

PARTS RECOMMENDATION AND PROCUREMENT SYSTEM AND METHOD

CROSS REFERENCE TO RELATED APPLICATIONS

This application claims the benefit of U.S. Provisional Application No. 62/049,769, filed Sep. 12, 2014, which is incorporated by reference herein in its entirety.

BACKGROUND

Transportation vehicles such as passenger automobiles, delivery trucks, emergency service vehicles, and the like commonly have on-board systems that store identification information and generate diagnostic information for the vehicle. Such on-board systems are typically accessible through electronic equipment and/or computer systems that can interact with the on-board system. The on-board system can include vehicle identification information such as year, make, model, and origination point of the vehicle, as well as the vehicle's "vehicle identification number" (VIN).

The on-board diagnostic system can generate information regarding the performance and condition of the electrical, mechanical, telemetric and other systems on the vehicle. For example, the on-board diagnostic system can generate information on how the engine is performing and whether any of the engine components are currently malfunctioning or failing. In one example, the on-board diagnostic system can identify one or more diagnostic trouble codes that correlate to malfunctioning or failing components or systems. When such diagnostic codes are provided to a repair or maintenance technician, the technician can use his or her experience and reference materials to identify the malfunctioning or failing component or system, determine what repairs are necessary, and determine what replacement parts to procure in order to perform the necessary repairs.

Technicians interpreting diagnostic codes and using their experience to determine what repairs are necessary and what replacement parts are required to perform the repair can be a time-consuming, inaccurate, and inefficient process. For example, a technician may need to search a manual or other such documentation in order to determine the meaning of an error code for a specific vehicle type if the technician is not familiar with the particular error code pertinent to that vehicle; the technician may have to research the meaning of the code then search a product catalog to determine what replacement parts may be required to perform a repair associated with the error code; and finally may need to visit multiple e-commerce websites or manually call parts suppliers to procure the replacement parts necessary to perform the repairs on the vehicle.

In addition to the example of an on-board diagnostic system used for transportation vehicles discussed above, a number of other products can include internal diagnostic systems that provide information about the product and the performance and condition of the product. For example, computer hardware; appliances; heating, ventilation, and air condition systems; etc. can include on-board systems that store product identification information and generate diagnostic information.

There is a need for systems and methods that simplify the process of diagnosing failures in a product, determining what parts are compatible with the product, including replacement parts required to correct any failure, and procuring the required replacement parts.

SUMMARY

A system and method for recommending and procuring parts to repair a malfunctioning vehicle is disclosed. A recommendation and procurement application can: take information from a vehicle's on-board diagnostic system and resulting analysis of collected unstructured digital postings, bulletins, and report data provided by OEM and aftermarket sources; recommend a list of parts required to repair the malfunctioning vehicle as well as provide a comprehensive listing of parts offered specifically for that vehicle; find the recommended parts for the specific malfunction and comprehensive listing of parts specifically for the vehicle available for purchase via the Internet; retrieve information on such recommended parts and parts applicable to vehicle; arrange the information in a simple format most useable to a technician that is to repair the vehicle; and allow the technician to purchase or otherwise procure such recommended parts to facilitate repair of the malfunctioning vehicle.

In one embodiment, a recommendation and procurement method can include steps to: receive automobile data comprising the year, make, and model of the automobile and a diagnostic code; identify a required repair based on the diagnostic code; recommend a part based on the received automobile data; receive a selection of a part; and process an order for the selected part.

In another embodiment, a computer implemented method for recommending and procuring a part can include receiving vehicle data comprising a vehicle identification number (VIN) of a vehicle and a diagnostic code of the vehicle. A codes database can be searched using the diagnostic code to identify maintenance information associated with the diagnostic code. A parts database can be accessed. The parts database can include parts data associated with vehicle identification information and a weighting factor. The parts data can be compiled from multiple sources. The multiple sources can include original equipment manufacturer (OEM) parts data and aftermarket parts data. The VIN of the vehicle and the vehicle identification information associated with the parts data can be compared, automatically with one or more processors, to identify compatible parts from the parts data. A recommended part can be recommended from the compatible parts based upon the maintenance information and the weighting factor associated with the compatible parts. A selection of a selected part can be received. An order for the selected part can be processed. The selected part and the VIN of the vehicle can be correlated automatically with the one or more processors. The weighting factor associated with the compatible parts can be adjusted based upon the selected part and the VIN of the vehicle that are correlated.

In another embodiment, a system for recommending and procuring a part can include a diagnostic interface device communicatively coupled to a computing device. The computing device can include one or more processors communicatively coupled to memory and a display. The one or more processors can execute machine readable instructions to receive a diagnostic code of an vehicle from the diagnostic interface device. Vehicle data can be received. The vehicle data can include a vehicle identification number (VIN) of the vehicle. A codes database can be searched using the diagnostic code to identify maintenance information associated with the diagnostic code. A parts database can be accessed. The parts database can include parts data associated with vehicle identification information and a weighting factor. The parts data can be compiled from multiple sources. The multiple sources can include original equipment manufacturer (OEM) parts data and aftermarket parts data. The VIN of the vehicle and the vehicle identification information associated with the parts data can be compared to identify compatible parts from the parts data. Recommended parts can be selected from the compatible parts based upon the maintenance information and the weighting factor associated with the compatible parts. The recommended parts can be presented upon the display. A selection indicative of a selected part can be received via the recommended parts. An order for the selected part can be processed. The selected part and the VIN of the vehicle can be correlated. The weighting factor associated with the compatible parts can be adjusted based upon the selected part and the VIN of the vehicle that are correlated.

In a further embodiment, a system for recommending and procuring parts can include a computer server and a plurality of computing devices. Each of the computing devices can execute machine readable instructions to: access a parts database that can include parts data associated with vehicle identification information; compare a vehicle identification number (VIN) of an vehicle and the vehicle identification information associated with the parts data to identify compatible parts from the parts data; select recommended parts from the compatible parts based upon maintenance information; receive a selection indicative of a selected part of the recommended parts; and correlate the selected part, the VIN of the automobile and the maintenance information. The computer server executes machine readable server instructions to: receive, from the computing devices, the selected part, the VIN of the vehicle and the maintenance information that are correlated; compile the selected part, the VIN of the vehicle and the maintenance information that are correlated into aggregated data; and analyze the aggregated data to determine baseline cost for a repair associated with the maintenance information.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component may be replaced with multiple components. Elements shown as multiple components may be replaced with a single component. The drawings may not be to scale. The proportion of certain elements may be exaggerated for the purpose of illustration.

DETAILED DESCRIPTION

This disclosure includes a number of definitions that are identified at the end of this detailed description. For this disclosure, the terms "computing device," "computer readable media," "logic," and "software" will include the definitions hereinafter provided in this detailed description.

Figure 1:
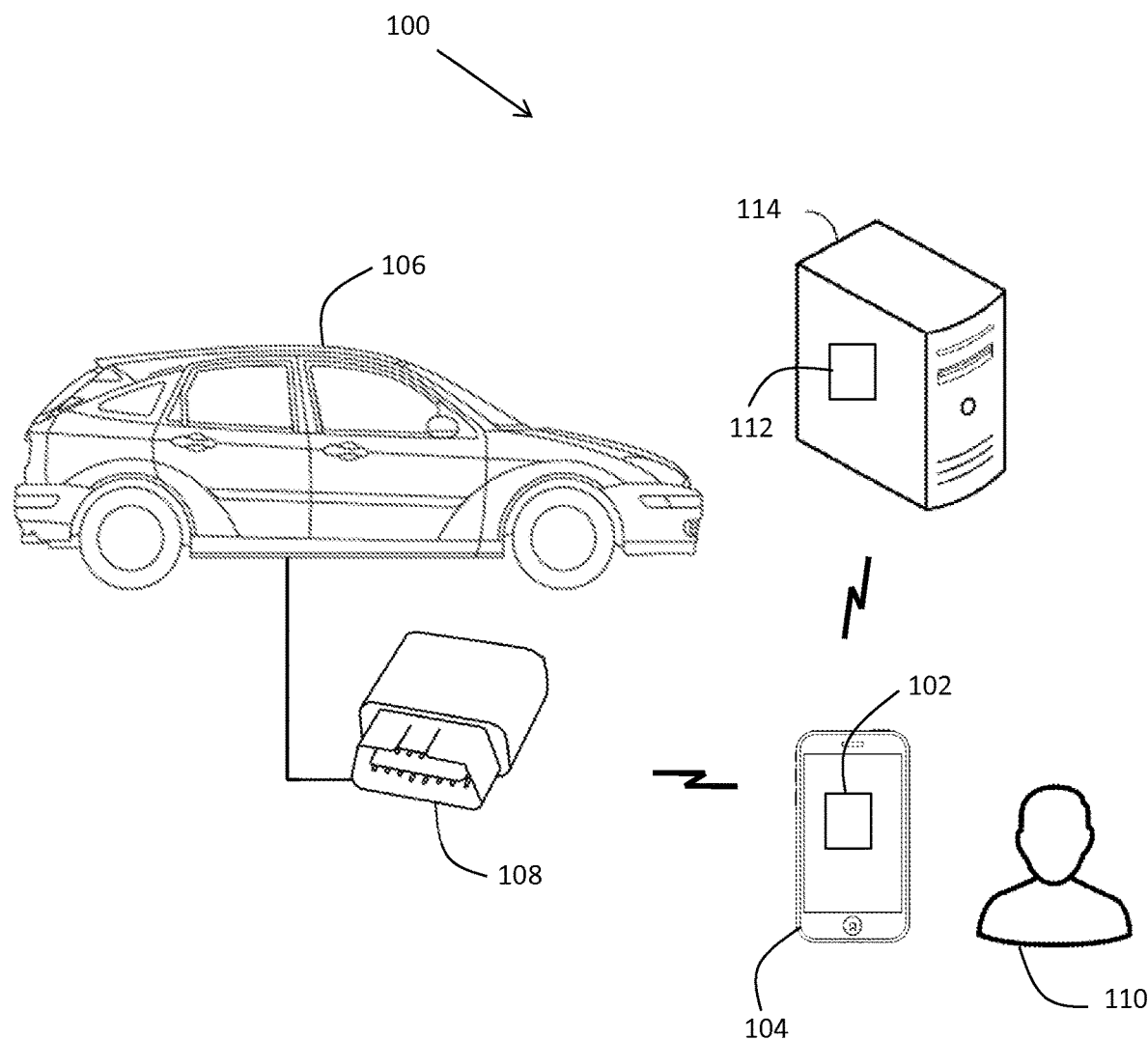
FIG. 1 illustrates an example parts recommendation and procurement system.

FIG. 1 illustrates an exemplary recommendation and procurement system 100 for identifying a list of recommended parts that are compatible with a vehicle, identifying needed repairs to the vehicle, recommending associated parts to accomplish the needed repairs, and procuring the recommended parts. For explanatory purposes only, some of the examples of systems described herein will refer to specific vehicles such as automobiles and automobile parts. It will be understood that, although the example systems and methods described herein may refer to automobiles and automobile parts, the example systems and methods can similarly be implemented to identify a list of compatible parts, identify needed repairs, recommend parts to accomplish repairs, and procure such parts for other types of vehicles such as trucks, boats, tractors, motorcycles, and the like. In addition, the example systems and method described herein may similarly be implemented to identify a list of compatible parts, identify needed repairs, recommend parts to accomplish the repair, and procure such parts for a variety of mechanical or electrical systems beyond vehicles.

System 100 includes a recommendation and procurement application 102 provided by a computing device 104. It should be appreciated that although computing device 104 is depicted as a smartphone in FIG. 1, the recommendation and procurement application 102 can be provided by any suitable computing device such as a tablet computer, a desktop computer, a laptop computer, and the like. The smart phone can comprise one or more processors for executing machine readable instructions to perform functions according to the methods described herein. As used herein, the term "processor" can mean any device capable of executing machine readable instructions. Accordingly, each processor can be a controller, an integrated circuit, a microchip, or any other device capable of implementing logic. Specific examples of the one or more processors can include a touch screen controller, a baseband controller, graphics processor, application processor, image processor, or the like. In some embodiments, the smart phone can implement a mobile operating system as machine readable instructions stored on memory and executed by the one or more processors. Specific examples of mobile operating systems include, but are not limited to, Android, iOS, Blackberry OS, Windows Phone, Symbian, and the like.

The recommendation and procurement application 102 is arranged to receive data about an automobile 106. The received data can include the automobile's VIN and the automobile's year of manufacture, make, and model, along with any other suitable information to help identify the automobile 106. The data received by the recommendation and procurement application 102 can further include diagnostic information about mechanical, electrical, and other systems of the automobile 106. Such diagnostic information can be presented in the form of alphanumeric codes that identify systems of the automobile 106 that may need to be serviced or repaired. For example, a diagnostic code can indicate that the transmission system of the automobile 106 is not functioning properly and therefore may require repair.

The recommendation and procurement application 102 can receive data about the automobile 106 through a variety of methods. In one example, a diagnostic interface device 108 interfaces with an on-board diagnostic system (not shown) of the automobile 106 to retrieve data about the automobile. The diagnostic interface device 108 can subsequently or simultaneously communicate the data to the recommendation and procurement application 102. The diagnostic interface device 108 can interface with the on-board diagnostic system using a number of protocols such as industry standard protocols such as OBDI, OBD1.5, OBDII or another suitable communication interface protocol. In one example, as illustrated in FIG. 1, the diagnostic interface device 108 communicates data to recommendation and procurement application 102 wirelessly via Bluetooth, WiFi, or via another suitable wireless connection. In another example, the diagnostic interface device 108 can communicate with the recommendation and procurement application 102 via a wired connection. For example, a USB cable (not shown) or other suitable cable can connect the diagnostic interface device 108 with the computing device 104.

In one example, recommendation and procurement application 102 can receive data via a user interface. For example, the recommendation and procurement application 102 can provide a user interface that prompts a technician 110 to enter a VIN. The recommendation and procurement application 102 then attempts to identify additional information about the automobile 106, such as the year, make and model, based on the received VIN. The recommendation and procurement application 102 can further prompt the technician 110 to provide information such as the year, make, and model of the automobile 106 if the recommendation and procurement application 102 is not able to determine the information automatically based on the provided VIN or if the technician 110 opts to not provide a VIN.

In one example, the VIN barcode can be read using a camera or scanner associated with computing device 104. The recommendation and procurement application 102 attempts to determine the VIN from the scan and identify additional information about the automobile 106, such as the year, make and model. The recommendation and procurement application 102 can further prompt the technician 110 to provide information such as the year, make, and model of the automobile 106 if the recommendation and procurement application 102 is not able to determine the information automatically based on the scanned VIN.

The recommendation and procurement application 102 can also provide a user interface that prompts a technician 110 to enter diagnostic codes manually. The user interface can include a free-form text field for receiving diagnostic codes, for example. The user interface can also provide a list of predefined diagnostic codes from which the technician 110 can select one or more applicable codes. The user interface can enable the technician 110 to search for a predefined diagnostic code by entering a search term, for example. The user interface can also enable a technician 110 to browse predefined diagnostic codes by selecting from and drilling down into different categories and subcategories of diagnostic codes.

In one example, the recommendation and procurement application 102 can provide a user interface that prompts a technician 110 to enter a description of a perceived problem, malfunctioning system, broken part, and so on, of the automobile 106. An example of such a situation can be when the technician 110 is assessing the results of automobile systems failure resulting in body and other mechanical damage to the automobile 106. For example, the technician 110 can input via the user interface a description such as "speed sensor failure," "overheating," and "car will not engage reverse." In one example, the recommendation and procurement application 102 can attempt to convert the description provided by the technician 110 to any applicable predefined diagnostic code. In another example, the recommendation and procurement application 102 can accept the description without trying to convert it to a predefined diagnostic code.

The recommendation and procurement application 102 can be arranged to use data obtained from the on-board diagnostic system and/or the technician 110 to identify a "parts catalog" that lists all parts known to the system 100 that are compatible with the specific vehicle. The parts catalog can include all parts required to repair the identified malfunction with the automobile 106, but also include all other compatible parts so that the technician 110 can use the parts catalog to perform general maintenance of the vehicle, upgrade components or system based on the vehicle owner's request, etc. The system 100 can include information and data on any and all vehicle parts offered for sale in the marketplace. For example the system 100 can include information and data on parts manufactured and supplied by original equipment manufacturers ("OEM"), manufacturers of aftermarket parts, parts distributors, parts wholesalers, etc. Thus, the recommendation and procurement application 102 can take information about the vehicle from the VIN or other sources and generate an exact parts catalog for the vehicle that includes parts supplied by OEMs, aftermarket manufacturers, parts distributors, parts wholesalers, etc.

Further, the recommendation and procurement application 102 can determine that the automobile 106 requires one or more parts or systems to be repaired or replaced in order for the automobile 106 to function properly. Therefore, the recommendation and procurement application 102 can provide a sub-list from the parts catalog that includes suggestions and recommendations for parts that can serve as replacement parts to facilitate repair of the automobile 106 so that the automobile 106 operates properly. Specifically, the recommendation and procurement application 102 can search the generated parts catalog and recommend the parts necessary to perform the identified repairs or maintenance. Based on the diagnostic trouble codes and telemetric data stored at the time of the malfunction, the recommendation and procurement application 102 can recommend a part or a group of parts that can be used to address the identified required repairs or suggested maintenance. In addition, the recommendation and procurement application 102 can use the received specific information about the automobile 106, such as the year, make, model condition, etc., to sort and/or filter lists of parts compatible with the vehicle 106 and recommend parts based on factors such as age of vehicle 106, condition of vehicle 106, anticipated service life of vehicle 106, and so on. In one example, if a vehicle 106 is relatively new, the parts catalog can be filtered and/or sorted to favor OEM parts. However, if the vehicle 106 is near the end of its projected service life, the parts catalog can be filtered and/or sorted to favor less expensive parts produced and distributed within the aftermarket.

The recommendation and procurement application 102 can enable the technician 110 to procure the recommended part or parts by placing an order for the recommended parts directly via the computing device 104. In particular, the recommendation and procurement application 102 can communicate with a sales system 112 on a computer server 114 that provides the recommendation and procurement application 102 with pricing, availability, and delivery information for each of the identified recommended parts. The computer server 104 can comprise one or more processors communicatively coupled to memory. It is noted that, while the computer server 104 is schematically depicted in FIG. 1 as being a single machine, applications and functions of the server can be distributed amongst a plurality of machines that are communicatively coupled to one another. In some embodiments, the one or more processors of the computer server 104 can execute web server software provided as machine readable instructions that can be, for example, stored on memory. Suitable web server software includes, but is not limited to, Apache HTTP Server, Internet Information Services, Nginx, Google Web Server, or the like. Accordingly, the social network server 200 can utilize a server operating system such as, for example, UNIX, LINUX, BSD, MICROSOFT WINDOWS, or the like. It is noted that the phrase "communicatively coupled," as used herein, can mean that components are capable of exchanging data signals with one another such as, for example, electrical signals via conductive medium, electromagnetic signals via air, optical signals via optical waveguides, and the like.

Once a selection is made via the recommendation and procurement application 102 and the selection is communicated to the sales system 112, the sales system 112 can place the order with a supplier and provides the recommendation and procurement application 102 with an order confirmation. For example, recommended parts can be provided as objects upon a display. A selection of the one or more recommended parts can be received as input provided to the corresponding recommended part, i.e., via clicking or touching a touch screen. In one example, the sales system 112 can also provide the recommendation and procurement application 102 with order tracking information.

In one example, a user login can be required before a technician 110 places an order with order system 112. If a technician 110 is not already registered as an existing customer, the technician 110 can be required to register as a new customer. In one example, a parts representative can be notified by the order system 112 when a new customer registers before the order is processed. In one example, recommendation and procurement application 102 can further customize or refine the recommended parts based on the registered customer's stored preferences, price category preference, or purchase history.

In one example, the order system 112 can communicate with third party applications or databases (not shown), such as an OEM part system or a distributor part system in order to obtain information about parts and availability. Such information can be obtained by the order system 112 in real time or periodically at scheduled time intervals. In one example, the order system 112 can provide a user interface to enable a systems administrator to modify parts information and availability manually or to perform other administrative functions such as tracking orders, canceling or updating orders, and so on.

In another example, the recommendation and procurement application 102 can directly access Internet websites such as the ordering website of OEMs, distributors, wholesalers, or other third parties that sell parts via the Internet. The recommendation and procurement application 102 can be arranged to search any number of websites for recommended parts and retrieve information on the parts from such numerous websites. The websites searched by the recommendation and procurement application 102 can be a list of websites that are preselected by the technician 110 or other responsible person within the technician's 110 organization. The recommendation and procurement application 102 can also use general searching algorithms such as those provided by Internet search engines, to search the Internet for recommended parts and provide information on such parts to the technician 110.

The parts catalog provided to the technician 110 can be sorted by a number of variables such as price, delivery time, manufacturer, supplier, and so on. The technician 110 can review the parts catalog or a sub-set of the parts catalog with recommended replacement parts and order such parts through the recommendation and procurement application 102. Thus, the recommendation and procurement application 102 can take information from a vehicle's on-board diagnostic system, generate a parts catalog of parts compatible with the specific vehicle 106, recommend a list of parts required to repair a malfunctioning vehicle, find the recommended parts available for purchase via the Internet, retrieve information on such recommended parts, arrange the information in a format most useable to a technician 110, and allow the technician 110 to purchase or otherwise procure such recommended parts to facilitate repair of a vehicle.

In one example, the recommendation and procurement application 102 provides additional information to a technician 110 that can assist the technician 110 in diagnosing and repairing or servicing the automobile 106. For example, recommendation and procurement application 102 can provide a technician 110 with repair bulletins or other similar types of news and information associated with a particular automobile. The recommendation and procurement application 102 can also provide suitable technical documents or manuals. Such information can be aggregated by computer server 114, for example, from various OEMs or aftermarket manufactures and then provided to the recommendation and procurement application 102. In another example, the recommendation and procurement application 102 can be configured to communicate with providers of such information directly.

It should be appreciated that although the recommendation and procurement application 102 has been described as being provided by computing device 104, a recommendation and procurement application 102 can also be provided as a software-as-a-service in the cloud (not shown), for example. In such an example, a recommendation and procurement application 102 can be hosted by computer server 112 or another remote computer server and is accessed by a recommendation interface (not shown) provided by the computing device 104 via the Internet. Accordingly, the logic and databases described herein can be accessed or provided via a software-as-a-service in the cloud.

Figure 2:
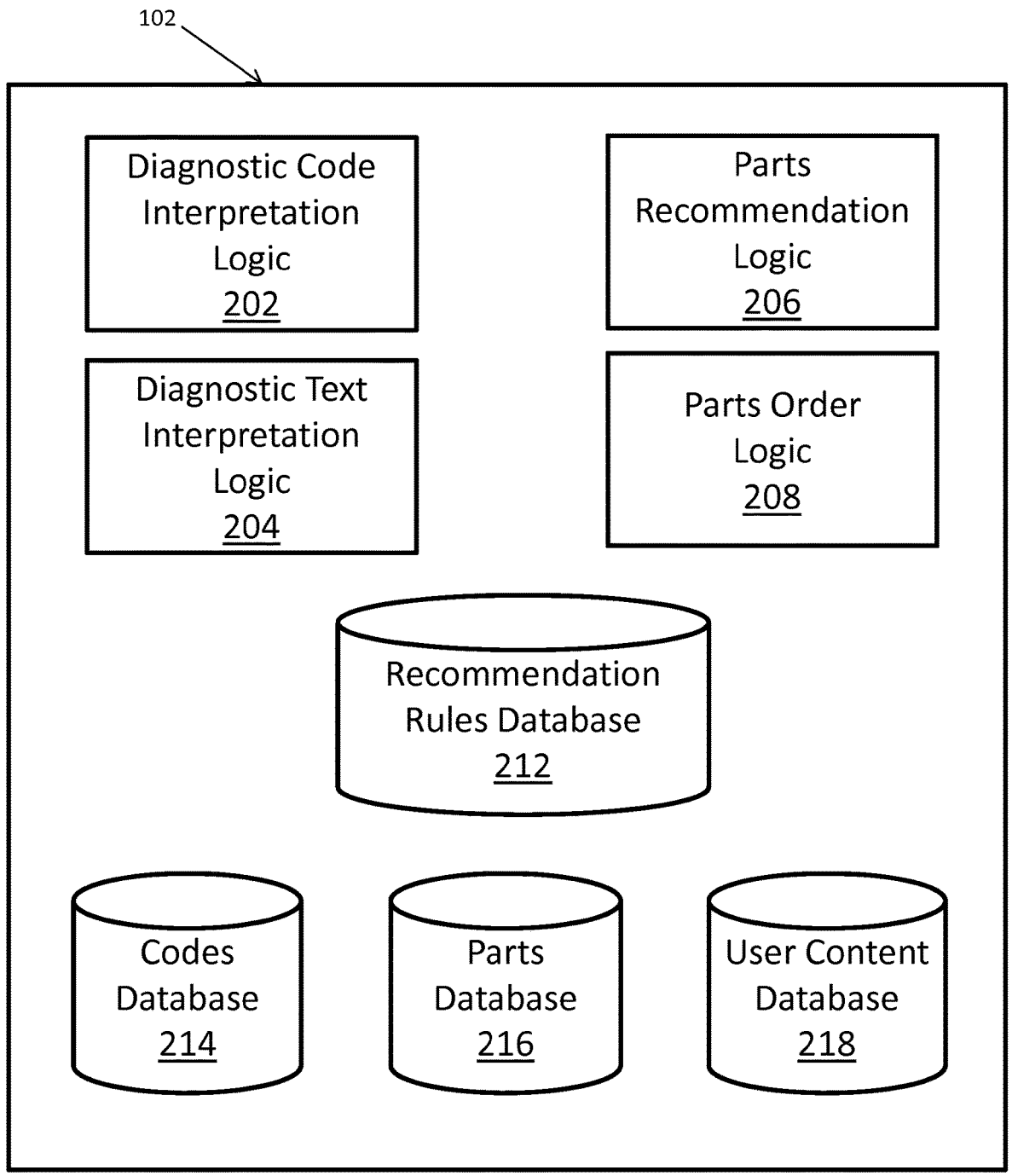
FIG. 2 illustrates a block diagram of an example parts recommendation and procurement application of FIG. 1.

FIG. 2 illustrates a block diagram of an example recommendation and procurement application 102 of FIG. 1. Recommendation and procurement application 102 includes diagnostic code interpretation logic 202 to receive a diagnostic code from a technician 110 or from an on-board diagnostic system and to interpret the meaning of the code. In particular, the diagnostic code interpretation logic 202 searches a codes database 214 to identify the diagnostic code and retrieves from the codes database 214 a needed repair or suggested maintenance associated with the diagnostic code. Recommendation and procurement application 102 can then convey the needed repair or the suggested maintenance associated with the diagnostic code to the technician 110.

Recommendation and procurement application 102 also includes diagnostic text interpretation logic 204 to interpret free-form text provided by a technician 110 in the absence of a diagnostic code. In particular, the codes database 214 can include keywords associated with the diagnostic codes. Text interpretation logic 204 searches the codes database 214 to identify keywords that match words included in the free-form text provided by the technician 110 and then retrieves a diagnostic code associated with the identified keywords. The retrieved diagnostic code can then be provided to the diagnostic code interpretation logic 202 for further processing as described.

Recommendation and procurement application 102 also includes parts recommendation logic 206 to generate a parts catalog of all parts compatible with a specific vehicle 106 based on the vehicle VIN. In particular, parts recommendation logic 206 can identify all parts in parts database 216 that are compatible with the specific vehicle regardless of source of the part or quality of the part. The parts recommendation logic 206 can further be configured to recommend one or more subsets of the parts catalog based on information such as the automobile year, make, model, and condition of the vehicle, for example, and based on the diagnostic codes received or retrieved from the vehicle 106.

In particular, parts recommendation logic 206 can identify one or more parts from parts database 216 that can be used in conjunction with performing an identified repair or maintenance procedure associated with a diagnostic code. In addition, the parts recommendation logic 206 can use one or more recommendation rules defined in recommendation rules database 212 to filter the identified parts and to recommend to a technician 110 one or more parts that can be used for the specific automobile having a given year, make, model, condition, and so on. In one example, the parts recommendation logic 206 further filters identified parts based on a registered user's or technician's stored preferences. For example, if a technician 110 has previously indicated a preference for purchasing parts from a particular manufacturer or distributor rather than from other manufacturers or distributors, then parts recommendation logic 206 can recommend parts made by the preferred manufacturer.

In one example, parts recommendation logic 206 creates a parts catalog that includes all known parts compatible with the identified vehicle 106. To generate such a custom parts catalog, parts recommendation logic 206 identifies all parts from parts database 216 that are compatible with a vehicle 106 associated with a specific VIN number. Such a custom part catalog enables a technician 110 or mechanic to conduct repairs or maintenance tasks that are independently diagnosed in addition to completing repairs that are generated by on-board diagnostic system.

It should be understood that parts database 216 can include data compiled from a variety of sources. For example, parts database 216 can include information and data provided by OEM's and information and data provided by aftermarket manufacturers. With regard to reliability of information and data, OEM provided information and data is typically very reliable. An OEM typically manufactures or sources replacement parts for its own vehicles and, thus, the parts are compatible for vehicles identified by the OEM. For parts manufactured or distributed within the aftermarket, information and data regarding compatibility with certain vehicles can be less reliable than OEM information and data. For example, manufacturers of aftermarket parts may recommend a part for use with a wide variety of years, makes, and models of vehicles. Although many if not most of such recommendations are reliable, experience can show that some of the recommendations lead to inconsistent performance for one or more specific recommended year, make, and model of vehicle. In particular, if a specific part is recommended for a particular vehicle by an aftermarket manufacturer, and auto mechanics routinely procure the part for that certain vehicle, it is likely that the part is a good match for that vehicle. Conversely, an aftermarket manufacturer recommends a part for a specific vehicles, and auto mechanics fail to procure the part for that specific vehicle (but generally procure the part for other vehicles), the part is likely not a good match for the specific vehicle despite the aftermarket manufacturer's recommendation. Accordingly, rules in the recommendation rules database 112 can initially follow the recommendations of the aftermarket manufactures. However, as will be explained in further detail below, data gathered and analyzed on the procurement habits of technicians and mechanics can modify rules over time. If technicians routinely fail to order a part that is recommended for a specific year, make, and model of vehicle, or frequently return the recommended part, the rules can be modified to either deemphasize the recommendation of the part or to stop recommending the part at all for the specific year, make, and model, of vehicle.

Another distinction for aftermarket parts is that such parts often are manufactured at a variety of quality and value points to meet the needs of consumers. For instance, an aftermarket manufacturer can manufacture a "good" product that is intended as an economical solution for a late model vehicle, a "better" product that is intended for vehicles that are out of warranty but still have a long projected service life, and a "best" product that is intended to compete with an OEM's comparable product. Accordingly, rules can be added to the recommendation rules database 212 that recommend parts for a vehicle based on warranty status, age of vehicle, condition of vehicle, consumer's budget, and so on. Such rules can be written by industry experts and modified by data reflecting procurement habits of technicians 110 using the system 100.

A further distinction for aftermarket parts is that an aftermarket part can be superior to an OEM part. In particular, an aftermarket part can be designed to replace an OEM part that has a sub-optimal design or minor flaw that has not been addressed by the design of the OEM's replacement part. Accordingly, rules can be added to the recommendation rules database 212 that recommend an aftermarket part above or on par with an OEM part when appropriate, even for a newer car. Such rules can be written by industry experts and modified by data reflecting procurement habits of technicians using the system 100.

By arranging a parts database 216 and recommendation rules database 212 that incorporate various data sources and is capable of being adjusted and refined over time by industry experts and data generated by technicians and mechanics using the system 100, the system 100 is able to systematize and continually improve a decision logic that replaces the current process employed by technicians and mechanics that manually evaluate repairs and maintenance issues for vehicles.

In one example, as noted above, system 100 is capable of "learning" by gathering and analyzing historic procurement data of users of the system 100. In particular, the system 100 can track the parts recommended by parts recommendation logic 206 and also tracks the parts that are ultimately procured by technicians 110 using the system 100. Based on such data, the system 100 can over time adjust the behavior of the system 100. In one example, the system assigns a "weighting factor" to parts relative to specific vehicles that is factored in when the system 100 generates a list of recommended parts for vehicles. For example, parts can be initially weighted by an industry expert based on data and information for parts manufacturers and distributors. Such weights determine if a part will be recommended for a particular vehicle, where it will fall in any sorting of compatible parts, whether it is filtered out of a list under certain conditions, search criteria, etc. However, the weight for a part can increase or decrease over time based on how the users of the system 100 actually procure a part when recommended or based on general trends in such procurement. Thus, a custom parts catalog generated for a particular VIN can be refined over time to increase accuracy based on actual use of the system 100 by technicians 110.

The system 100 can include a social media function that allows users of the system 100 to provide useful content for other users to review. Similarly, the system 100 can link to an existing external social media platform such as Facebook, YouTube, etc. Via such social media function, the system 100 can provide the technician 110 with a mechanism to document and explain the diagnosis of a problem, the parts procured to solve the problem, and the methods used to fix the problem. Such documentation can include text descriptions, pictures, links to websites, video, voice recordings, or any other medium that can relay information. When such content is created, it can be offered to subsequent users to assist in procuring parts and making repairs. The system 100 can be arranged to adjust recommendation rules based on such qualitative data provided by technicians 110 or other users. For example, such content can also be used by an industry expert to refine existing rules or generate new rules based on the users of the system 100 successfully repairing a vehicle.

As noted above, the user interface can include a free-form text field for receiving diagnostic codes, for example. If the text interpretation logic 204 is unable to identify a diagnostic code associated with keywords that match words in a provided free-form text description, parts recommendation logic 206 can recommend a part based on the free-form text according to one or more rules stored in the recommendation rules database 212.

Recommendation and procurement application 102 also includes parts order logic 208 for processing an order for a part. In particular, parts order logic 208 receives a selection of a part from a technician 110 or another user and communicates a request to purchase the part to the sales system 112. In one example, parts order logic 208 obtains parts information from the sale system 112 such as pricing, inventory, and delivery availability and provides such information to the technician 110. In one example, parts order logic 208 receives an order confirmation and order tracking information and provides such information to the technician 110.

In one example, recommendation rules database 212, codes database 214, and parts database 216 can be imported from or hosted by a third party provider such as a manufacturer or an OEM. In one example, recommendation rules database 212, codes database 214, and parts database 216 can be created or modified by a technician, a group of technicians, an administrator, industry expert, or another user given proper access credentials.

It should be appreciated that, in addition to the structured data provided by third parties, a substantial amount of unstructured data in the form of videos, written repair instructions, wiring schematics, bulletins, and other technical and marketing materials may be available. Such unstructured data, which represent valuable industry knowledge and experience, may be produced by OEMs, aftermarket manufacturers, distributors, and experienced mechanics that produce video content, blog descriptions, etc. regarding general or specific vehicle repair and maintenance tasks. Accordingly, such unstructured data can be used by industry experts when adding or modifying rules in the recommendation rules database 212 or by data scientists using big data analysis techniques to correlate the unstructured data sets to lead to more accurate parts catalogs and sub-lists for technicians and auto mechanics. In addition, such unstructured data can also be stored in a user content database 218 and can be provided to technicians and auto mechanics during the procurement process to help the technician make a procurement choice and/or provided to the technician after procurement to assist in the repair of the vehicle.

The system 100 can also provide businesses using the system 100 with information regarding how the business is managing the processes of diagnosing and repairing vehicles. In one example, the system 100 can compile data obtained from multiple auto repair shops. Such data can be analyzed to serve as a baseline for average performance of an auto repair shop. The system 100 can then analyze the performance of an individual repair shop and compare it to the baseline for all auto repair shops and provide the individual repair shop with guidance for improving operations. For example, system 100 can notify a particular repair shop if the shop is not performing as many of a specific vehicle repair as are other repair shops on average or how the repair shop's quotes compare to other similarly situated repair shops. In addition, the system 100 can use data analytics to help the particular repair ship determine if it may be losing business as a result of incorrect diagnosis, comparatively high price quotes, procurement practices that differ from the industry norm, and so on. The system 100 can also provide data on best practices, lists of parts that are selected most often by repair shops collectively, quality of parts providers, and so on. The system 100 can be arranged to gather such data in a manner that protects the business information or any personal information gathered by the system 100. For instance, any business information gathered can be pooled and averaged so that quotes, policies, workflow, repairs, etc. associated with any specific repair shop cannot be viewed or deduced by competitors or any other third party. Further, the system 100 can be arranged to gather data in a manner that complies will all federal, state, and local laws and regulations regarding data collection and privacy.

The data and information compiled by the system 100 can also be provided to aftermarket manufacturers, distributors, repair shops, and OEMs for conducting their own analysis. For example, OEMs may have relatively robust data for vehicles that are under manufacturer's warranty. However, once vehicles are out of warranty, OEMs may have little or no data for vehicles. Since a vehicle warranty typically only lasts between 3 and 5 years, but an average service life of a car or light truck can be as much as 11 or 12 years, an OEM may not have adequate data for a majority of a vehicle's service life. By correlating repairs to VIN numbers, the system 100 is capable of providing a more complete data set for the complete service life of the vehicle. An OEM can use such supplemental data to improve its business.

In one example, in addition to collecting data about vehicle repairs, system 100 also collects data when a repair is declined. Such data is typically not collected. Such data can be valuable to repair shops, OEMs, aftermarket manufacturers, or distributors because the data can provide insight as to why a repair was declined. In particular, the data can provide insight as to whether the quoted price or the duration required to repair the vehicle was objectionable. To provide such insight, the system 100 correlates a parts list for a proposed repair and tracks if that repair was authorized or declined by the vehicle owner. In addition, the system 100 can collect data from the same vehicle as it visits multiple repair shops to "shop" for the best price for a repair. If a repair that is normally accepted is declined, the declined quote can be analyzed to determine how it differed from accepted quotes. Further, if a specific vehicle owner declined the quoted repair work at one shop, but accepted the quoted repair work at another shop, the quotes can be analyzed to gain insight into the vehicle owner's decision making process. In one example, the system 100 can make such data anonymous to secure the vehicle owner's privacy and the quoting practices of any specific auto repair shop.

In one example, system 100 collects and stores data specific to an individual vehicle. As a vehicle ages, its repair and maintenance history can be pertinent to making additional procurement and repair decisions. By storing such repair history of a specific vehicle, the system 100 can provide such historical data to the vehicle owner and to the auto mechanic that is analyzing the vehicle for new repair or maintenance work. Access to such information will result in more efficient and complete repair and maintenance of a vehicle.

As will be appreciated, the system can offer substantial assistance to repair shops preparing estimated quotes for a variety of repair and maintenance jobs. The system 100 can evaluate the diagnostic codes and correlate attributes of the vehicle such as year, make, model, residual value, mileage, condition, etc. with attributes of recommended replacement parts such as cost, quality, and function of OEM, aftermarket, and remanufactured parts. The system 100 can further take in to consideration estimated labor time and associated costs to repair the vehicle and the vehicle operator's budget. Based on such considerations, the system 100 can recommend replacement parts that best suit the vehicle owner. Such recommendations can be accompanied by robust sort and filtering tools that permit users or a vehicle owner to select parts based upon any number of additional product attributes such as size, weight, color, etc. When a vehicle owner or system user is interested in replacing an existing part with the same or similar part, the system 100 can use visual camera recognition technology to select a replacement part.

As discussed, the system 100 can be arranged to incorporate the system user or vehicle owner's preferences when recommending parts. The use of such preferences customize the parts recommendations algorithms. The algorithms can generally take into consideration specific brand, product, price point, delivery time, etc. preferences of a repair shop. User preferences can also provide authority level settings for multiple users within a given shop amongst other features.

To provide information on previously procured parts, the system 100 can provide post-order inquiry features. In one example, a repair shop can track the order status for items ordered but not yet received. In another example, the repair shop can look up past orders of parts to repair vehicles to inform future procurement decisions. For example, if a user remembers a past transaction that is similar to a current repair job, the user can search the system 100 for that similar transaction to gain insight into what parts to procure and method for repairing the vehicle. The system 100 can also provide users with the ability to view its account balances with various vendors. In addition, the system 100 can provide for a repair shop to view account balances and terms of payment for its customers.

The system 100 incorporates a returned goods authorization (RGA) process.

The system 100 provides functionality for repair shops and their customers (vehicle owners) to interact. For example, a mechanism can interact through chat services or video link to answer questions or gather information. Similarly, the repair shop can interact with customer service and technical support personnel at a vendor or parts manufacturer through chat services or video link. Such communications can be via land-line, cellular telephone, voice over IP, video over IP, and the like.

The system can be arranged to provide the user with three-dimensional exploded views of vehicles. Such functionality includes the ability to isolate individual parts for inspection and comparison of defective part.

The system 100 further provides a technician with the ability to diagnose an issue through a series of questions or prompts specific for that vehicle. Such functionality can be provided while the technician replicates the described issue(s) during a drive test.

As previously described, the systems and methods described herein are applicable to products and industries beyond vehicles and vehicle repair. The system is applicable to any industry where any readable code indicative of a need for repair is generated, and the product that requires repair includes structured information about itself (i.e., a code analogous to a VIN). One example is household appliances such as refrigerators and dishwashers. Household appliances include an identification code similar to a VIN, and many newer appliances generate error codes. Such appliances can communicate those codes to the home owner or a repairman. Such codes can be used to generate a parts catalog for the specific appliance, diagnose a specific issue, provide recommendation parts to correct the specific issue, and facilitate the procurement of replacement parts.

The system can be configured such that a consumer (owner of the product) is a user. When a repair code is detected, the system can provide the user with a list of repair shops capable of performing the repair. Additional information can be provided, such as estimated cost of repair, location, distance from home, ratings, experience, and written customer comments for repair shop. Once a user selects a repair shop, an appointment can be generated, and the repair information can be forwarded to the repair shop so that it is ready to repair the product upon arrival. The system can also generate an estimated cost of performing the repair and a list of parts required for the repair (so that a user could consider performing the repair themselves). Such functionality can be provided on a portable device such as a tablet or smart phone via an app (similar to the commercial version used by repair persons).

The system can be integrated into a shop management system and actively provide analytics for efficiently operating the shop. The system can be integrated with the diagnostic tools to fully automate the processes so there is no need for an auto mechanic or user to manually enter error code, VIN, etc. The system can be integrated with OEM, aftermarket manufacturers, and distributor systems. The system can share analytics directly with such systems and can receive updates or additional structured or unstructured data from such systems. Certain repairs require "flashing software" that resets electronic and computer systems firmware on-board the vehicle. Integration can include providing access to such flashing software to technicians and auto mechanics that are repairing or maintain vehicles. The system can further include providing licenses to the flashing software and tracking use of such software and licenses by repair shops in order to pay proper licensing fees to the software owner.

Figure 3:
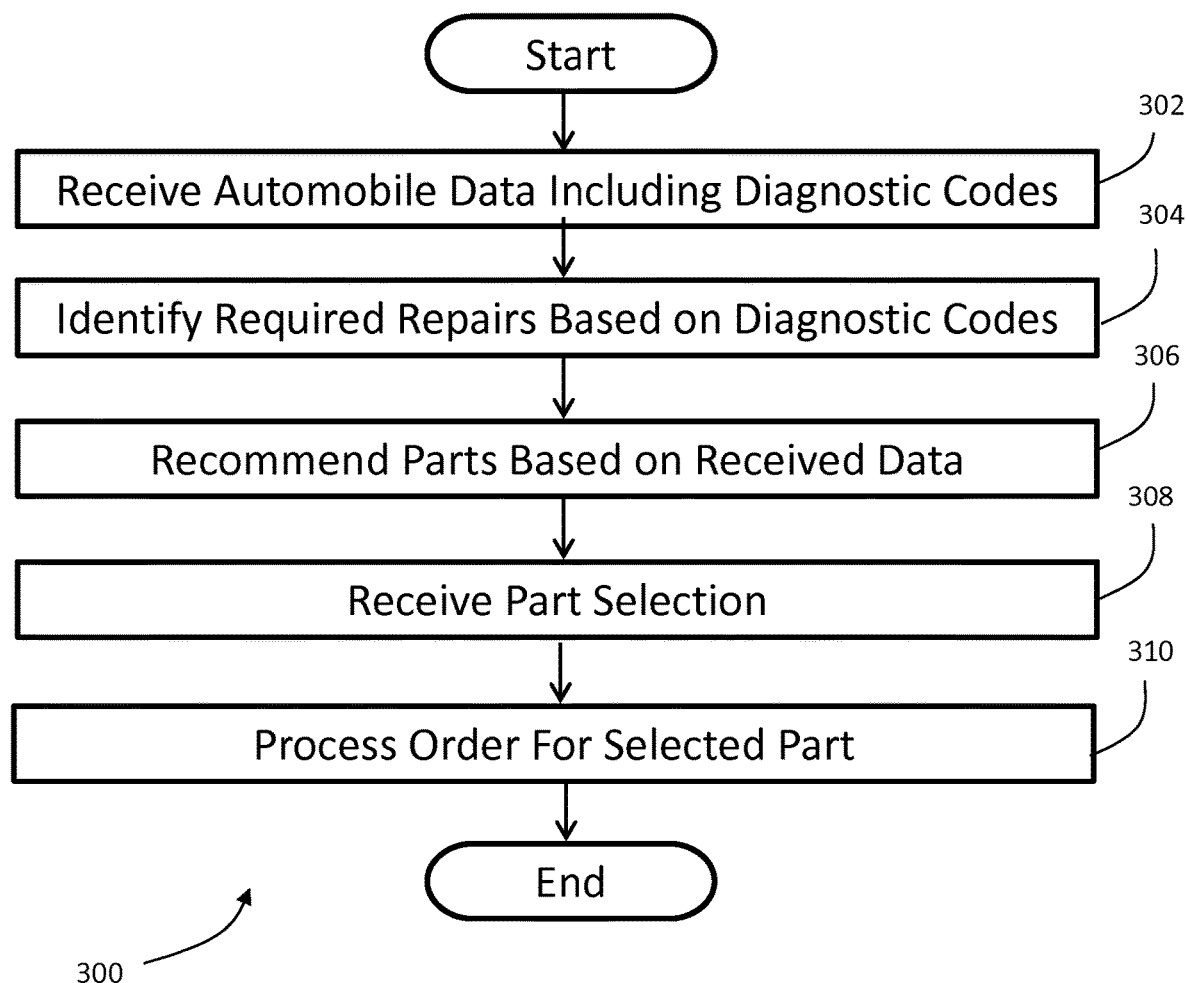
FIG. 3 is a flow chart of an example parts recommendation and procurement method.

FIG. 3 is a flow chart illustrating an example parts recommendation method 300. At step 302, the recommendation and procurement application 102 receives automobile data including diagnostic codes. Automobile data may be received from an on-board diagnostic system, via manual user input, by scanning a VIN, or by any combination thereof. At step 304, the recommendation and procurement application 102 identifies required repairs based on received diagnostic codes. At step 306, the recommendation and procurement application 102 recommends a part based on the received automobile data. At step 308, the recommendation and procurement application 102 receives a selection of a part. At step 310, the recommendation and procurement application 102 processes an order for the selected part.

Figure 4A:
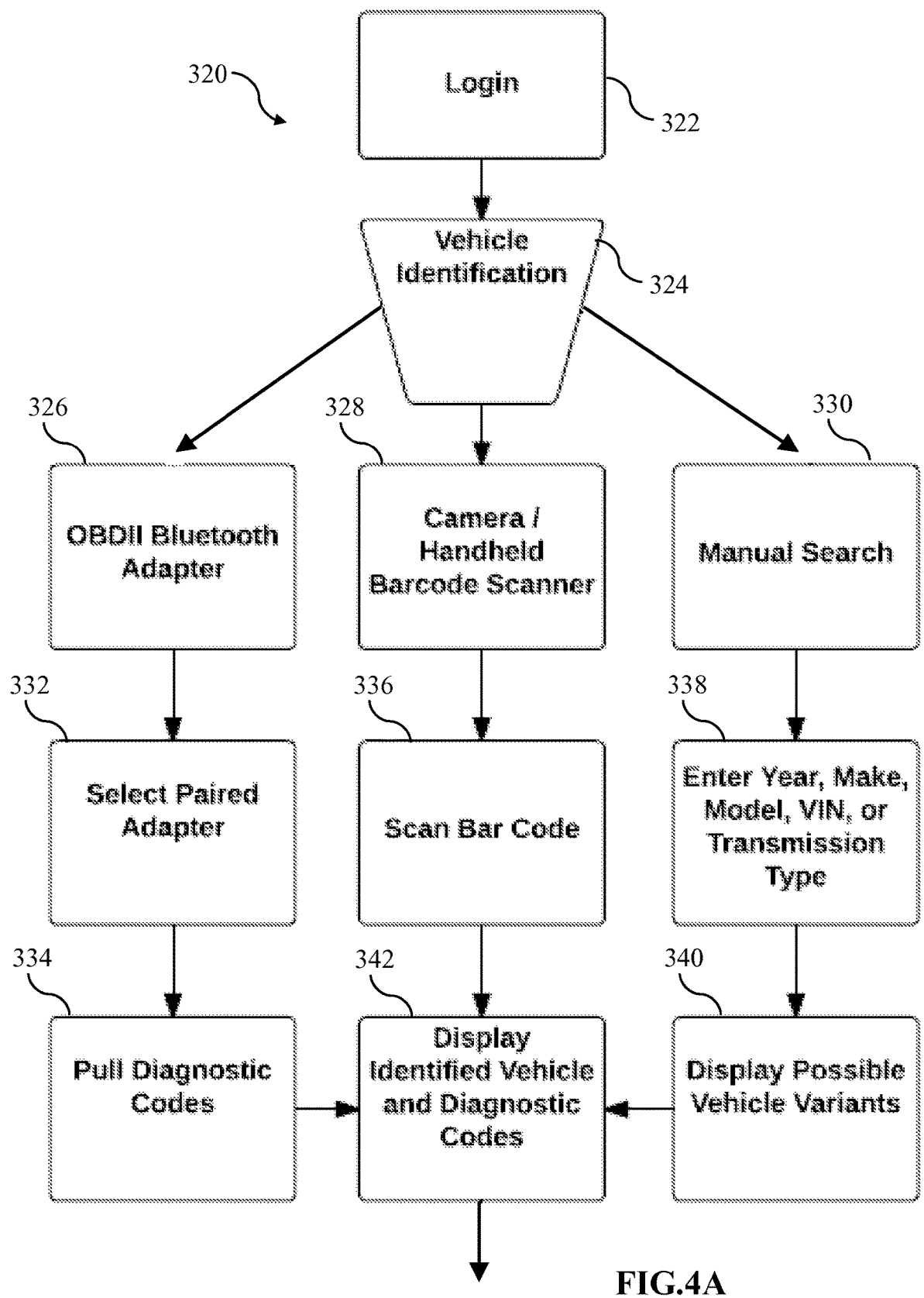
FIGS. 4A and 4B provide a flow chart of an example parts recommendation and procurement method.
Figure 4B:
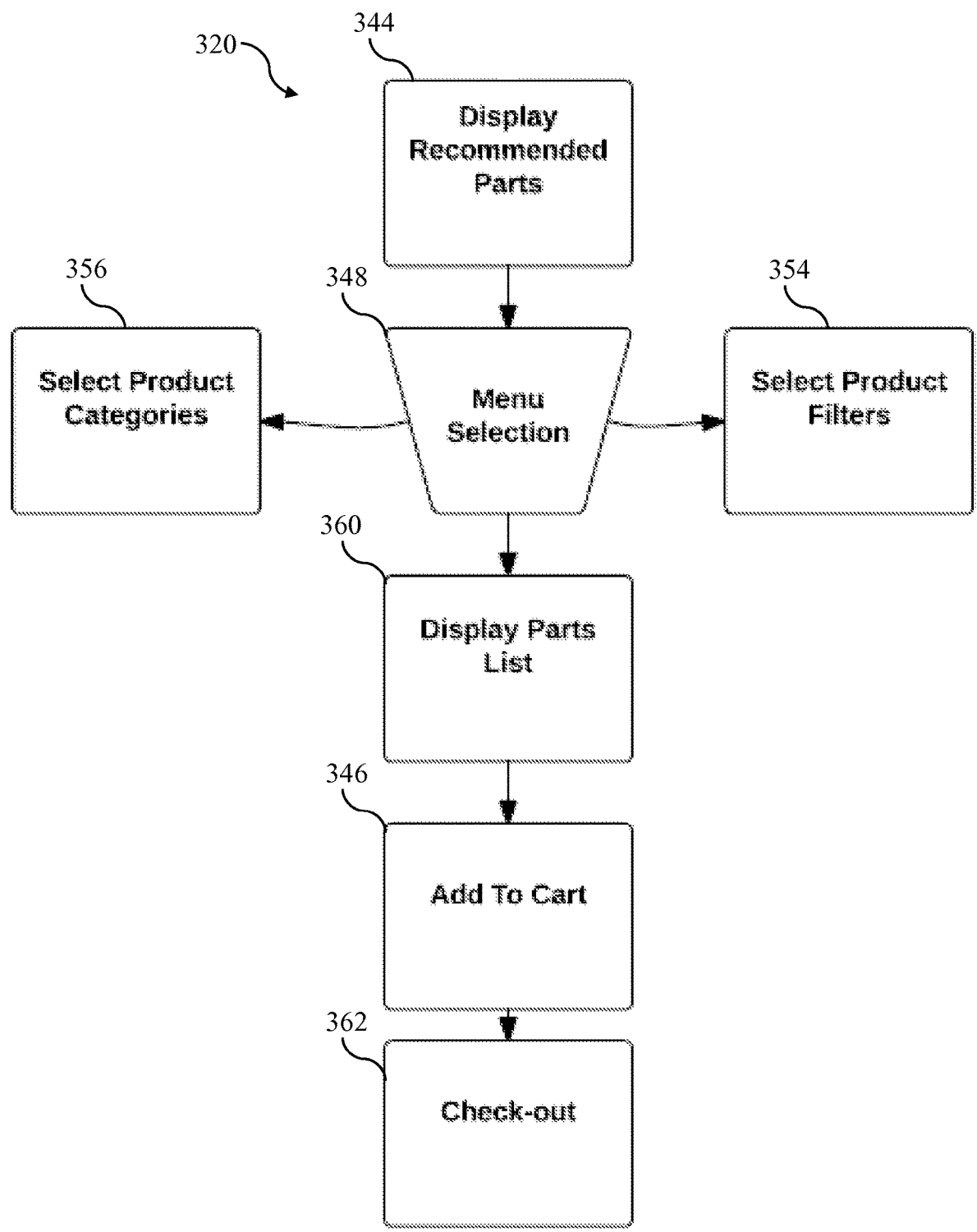

FIGS. 4A and 4B schematically depict a flow chart illustrating an example parts recommendation method 320 that can be executed by the recommendation and procurement application 102 (FIG. 1). At step 322, the method 320 can receive login credentials associated with a registered user. For example, a user interface can be configured to receive input indicative of a user name and a password. Once the login credentials are confirmed, the method 320 can move to step 324.

At step 324, the method 320 can present one or more processes for identifying parts. For example, the method 320 can present a user interface for selecting a desired process. In some embodiments, an interface device process 326 can be presented. Alternatively or additionally, a scanning process 328, a manual search process 330, or both can be presented. When the interface device process 326 is selected, i.e., via touch screen input, mouse click, or the like, the method 320 can proceed to step 332.

Referring collectively to FIGS. 1, 4A, and 4B, at step 332, a selection of diagnostic interface devices 108 can be made. For example, a user interface can present a listing of the diagnostic interface devices 108 that are communicatively coupled to the computing device 104 such as, for example, paired via Bluetooth. Upon selecting the desired diagnostic interface device 108, the method 320 can proceed to step 334. At step 334, diagnostic codes can be retrieved from the automobile 106.

When the scanning process 328 is selected at step 324, the method 320 can proceed to step 336. At step 336, the VIN barcode of an automobile 104 can be read using a camera or scanner associated with computing device 104. When the manual search process 330 is selected at step 324, the method can proceed to step 338.

At step 338, the method 320 can be configured to receive input indicative of the VIN of the automobile 104. Alternatively or additionally, the method 320 can be configured to receive input indicative of vehicle identification information such as, for example, year, make, model, part category, or combinations thereof. Upon receiving the input, the method can proceed to step 340. At step 340, a user interface can present a listing of specific vehicle variants that match the vehicle identification information. Accordingly, if a partial VIN or insufficient vehicle identification information is provided at step 338, the list can include specific vehicle variants that match the provided information. The method 320 can be configured to receive input indicative of a selection of one of the specific vehicle variants. Upon selection of one of the vehicle variants, the method 320 can proceed to step 342.

At step 342, method 320 can be configured to receive input indicative of the selection a repair associated with the diagnostic codes. For example, a user interface can present a listing of repairs associated with the diagnostic codes. Upon selection of one of the repairs, the method 320 can proceed to step 344.

Figure 5:
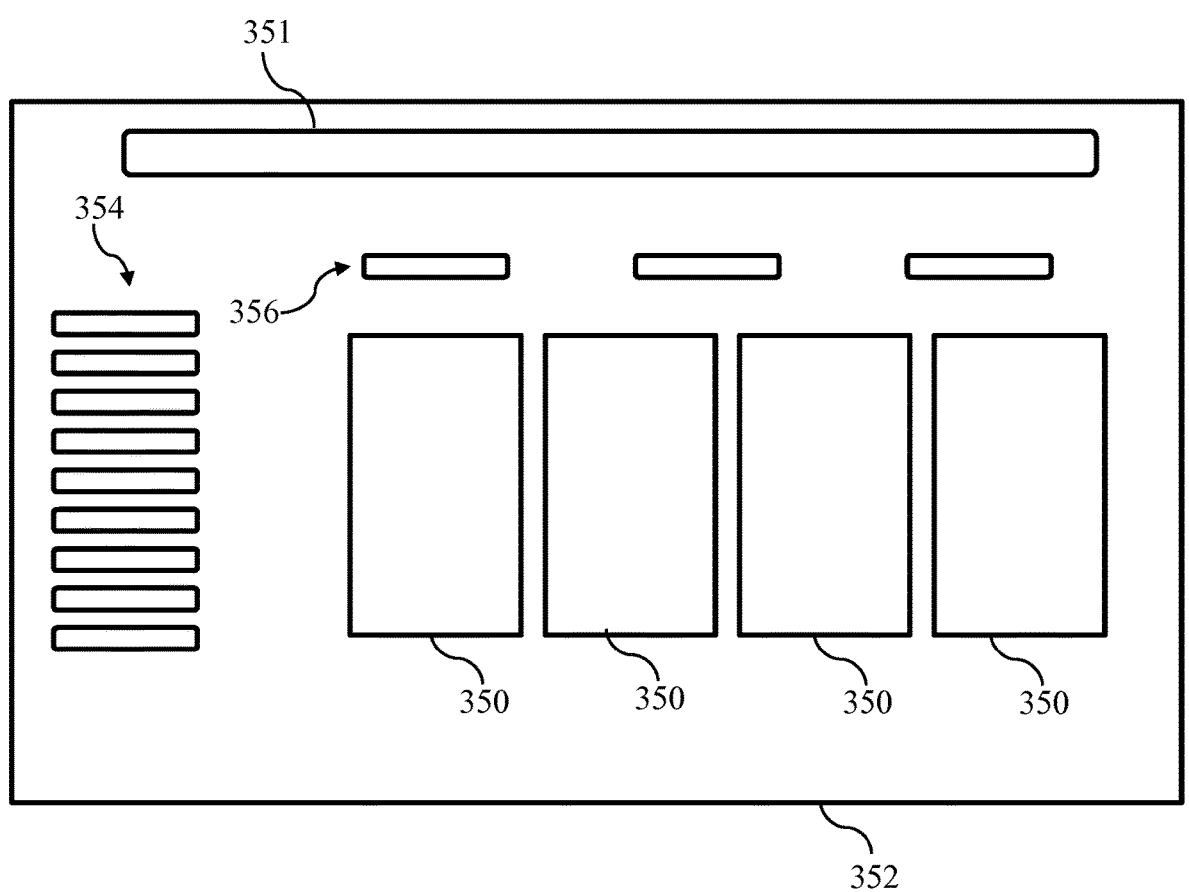
FIG. 5 schematically depicts a graphical user interface that can be presented upon a display.

Referring collectively to FIGS. 4B and 5, at step 344, the method 320 can present recommended parts 350. Specifically, the method 320 can present a graphical user interface 352. The graphical user interface 352 can comprise the recommended parts 350 and an identification object 351. In some embodiments, the recommended parts 350 can be selected from the compatible parts of the based upon the selected repair and other recommendation rules, as described herein. The identification object 351 can provide a summary of the VIN, the vehicle identification information, the selected repair, or a combination thereof. Alternatively or additionally, the recommended parts 350 can be configured to receive input indicative of selection of the recommended part 350. Upon the selection of the recommended parts 350, the method 320 can proceed to step 346.

In some embodiments, step 344 can further provide menu selections 348 for displaying parts other than the recommended parts 350 from the parts catalog. For example, the graphical user interface 352 can comprise product filters 354 for filtering the parts catalog by applying any of the filters described herein. In some embodiments, once input is provided to one of the product filters 354, the method 320 can proceed to step 360. At step 360, the filter can be applied to the parts catalogue and part objects corresponding to the applied filter can be displayed. In some embodiments, the part objects can be configured to receive input indicative of selection of one of the filtered parts. Alternatively or additionally, the graphical user interface 352 can comprise product categories 356 that can be used to browse part categories of the catalog. Accordingly, the product categories can drill down into different categories and subcategories of parts. Specifically, once input is provided to one of the product categories 356, the method 320 can proceed to step 360. At step 360, part objects corresponding to the selected parts categories 356 can be displayed. Upon the selection of the parts objects, the method 320 can proceed to step 346.

At step 346, each of the selected parts can be provided in a cart user interface. For example, the selected parts can be listed along with an itemized price list and price total. In some embodiments, the cart user interface can be configured to receive input indicative of a request to process the order. Once such input is received, the method 320 can proceed to step 362, whereby the order is processed as described herein.

Figure 6:
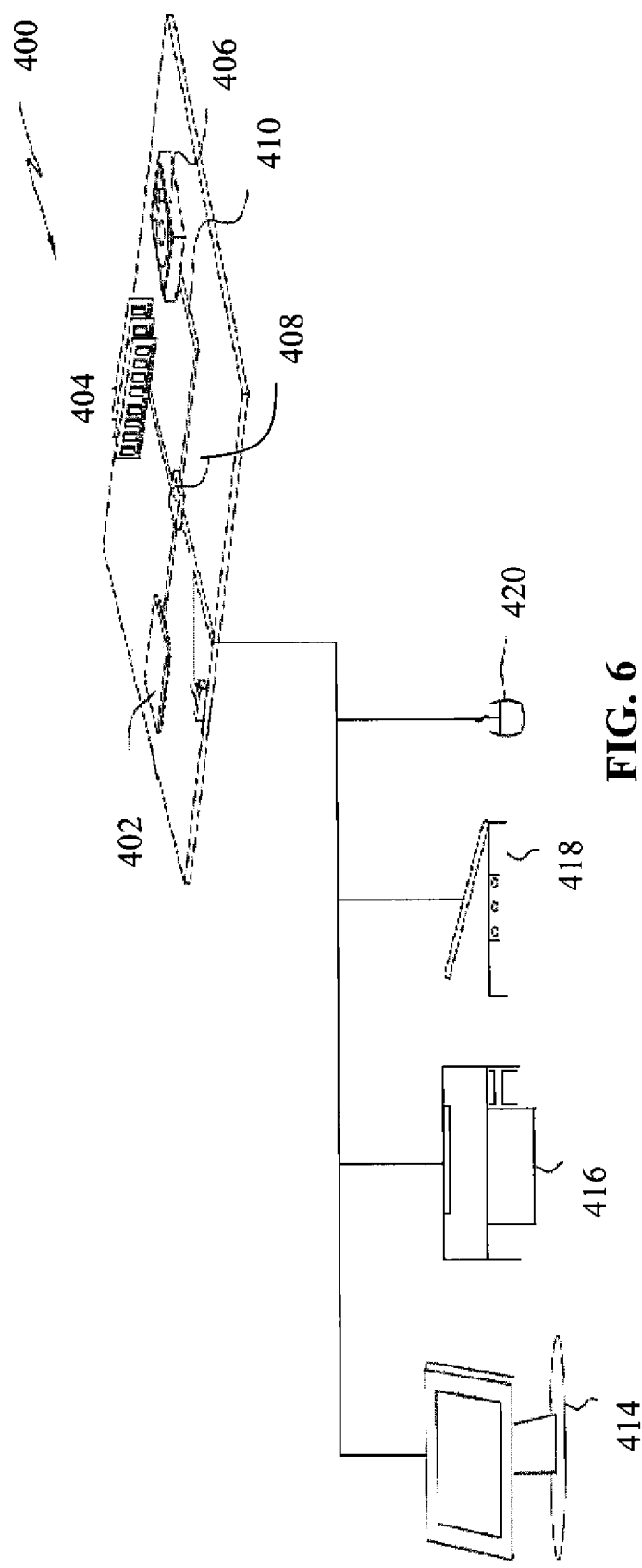
FIG. 6 is a block diagram of an example computing system for implementing an example parts recommendation and procurement system.

FIG. 6 is a block diagram of an example computing system 400 for implementing an example parts recommendation system. The example computing system 400 is intended to represent various forms of digital computers, including laptops, desktops, handheld computers, smartphones, tablet computers, servers, and other similar types of computing devices. As shown, computing system 400 includes one or more processors 402, memory 404, a storage device 406, and a communication port 408, operably connected by an interface 410 via a bus 412.

The one or more processors 402 process instructions, via memory 404, for execution within computing system 400. In an example embodiment, multiple processors along with multiple memories may be used.

Memory 404 may be volatile memory or non-volatile memory. Memory 404 may be a computer-readable medium, such as a magnetic disk or optical disk. Storage device 406 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 404 or storage device 706.

Computing system 400 may be coupled to one or more input and output devices such as a display 414, a printer 416, a scanner 418, and a mouse 420. In some embodiments, the display 414 can be configured to selectively illuminated a plurality of pixels to provide the optical signals. Accordingly, the display 414 can comprise light emitting diodes (LED or OLED), liquid crystal display (LCD), liquid crystal on silicon (LCOS), or the like. Additionally, the display 414 can be configured to operate as a touch screen for accepting input via visual controls. Accordingly, the display 414 can comprise a touch detector such as, for example, a resistive sensor, capacitive sensor, or the like. It is noted that the display 414, when provided upon a smart phone can be defined by a screen size of less than about 6 inches in one embodiment such as, for example, less than or equal to about 5.7 inches in another embodiment. It is furthermore noted that the term "signal," as used herein, can mean a waveform (e.g., electrical, optical, magnetic, or electromagnetic), such as DC, AC, sinusoidal-wave, triangular-wave, square-wave, and the like, capable of traveling through a medium.

While example systems, methods, and so on, have been illustrated by describing examples, and while the examples have been described in considerable detail, it is not the intention to restrict or in any way limit the scope of the appended claims to such detail. It is simply not possible to describe every conceivable combination of components or methodologies for purposes of describing the systems, methods, and so on. With the benefit of this application, additional advantages and modifications will readily appear to those skilled in the art. The scope of the invention is to be determined by the appended claims and their equivalents.

The following includes definitions of selected terms employed herein. The definitions include various examples, forms, or both of components that fall within the scope of a term and that may be used for implementation. The examples are not intended to be limiting. Both singular and plural forms of terms may be within the definitions.

"Computing device," as used herein, refers to a laptop computer, a desktop computer, a smartphone, a personal digital assistant, a cellular telephone, a tablet computer, an eReader, or the like.

"Computer-readable medium," as used herein, refers to a medium that participates in directly or indirectly providing signals, instructions, or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory, and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, Phase Change Memory, and other media from which a computer, a processor, or other electronic device can read. Signals used to propagate instructions or other software over a network, like the Internet, can be considered a "computer-readable medium."

"Logic," as used herein, includes but is not limited to hardware, firmware, software, or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Software," as used herein, includes but is not limited to, one or more computer or processor instructions that can be read, interpreted, compiled, or executed and that cause a computer, processor, or other electronic device to perform functions, actions, or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system, or other types of executable instructions. The form of software may depend, for example, on requirements of a desired application, the environment in which it runs, or the desires of a designer/programmer or the like. Computer-readable or executable instructions can be located in one logic or distributed between two or more communicating, co-operating, or parallel processing logics and, thus, can be loaded or executed in serial, parallel, massively parallel, and other manners. One form of software is an app, or an application that executes on a mobile computing device such as a mobile phone.

Suitable software for implementing the various components of the example systems and methods described herein may be produced using programming languages and tools like Haskell, Java, Java Script, Java.NET, ASP.NET, VB.NET, Cocoa, Pascal, C #, C++, C, CGI, Perl, Python, SQL, APIs, SDKs, assembly, firmware, microcode, or other languages and tools. Software, whether an entire system or a component of a system, may be embodied as an article of manufacture and maintained or provided as part of a computer-readable medium. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A computer-implemented method for recommending a part for a vehicle comprising:
    recommending via a computing device, an aftermarket part based on a detected fault condition of a vehicle, a current operating condition of the vehicle, wherein the detected fault condition is stored in a memory of the vehicle, and wherein the computing device executes the following steps via the network, comprising:
    receiving from a diagnostic interface device, vehicle data comprising a vehicle identification number (VIN) for a vehicle and a diagnostic code for the vehicle, wherein the diagnostic code associated with the detected fault condition is retrieved by the diagnostic interface device running a diagnostic application and connecting to an on-board vehicle diagnostic system to retrieve the vehicle data;
    searching via a network, a diagnostic code database for maintenance information based on the diagnostic code;
    querying a parts database comprising parts data characterizing a plurality of parts compatible with a plurality of vehicles, wherein the parts data is provided from a plurality of data sources, and wherein the parts data comprises original equipment manufacturer (OEM) parts data and aftermarket parts data;
    wherein querying the parts database comprises identifying a subset of parts of the plurality of parts compatible with the vehicle by evaluating the detected fault condition and the VIN;
    recommending at least one aftermarket part from the subset of parts compatible with the vehicle based on the detected fault condition, the current operating condition, the maintenance information and a weighting factor associated with the at least one recommended aftermarket part;
    modifying a part recommendation rule set in response to the at least one recommended aftermarket part from the subset of parts compatible with the vehicle;
    adjusting the weighting factor associated with the at least one recommended aftermarket part from the subset of parts compatible with the vehicle based on the modified part recommendation rule set;
    transmitting a subsequent recommendation of the at least one part from the subset of parts compatible with the detected fault condition and the vehicle based on the adjusted weighting factor after a subsequent query of the parts database;
    requesting or procuring through the network, the at least one recommended aftermarket part to accomplish needed repairs in the vehicle; and
    sending after the needed repair, a reset signal through the diagnostic interface device to reset on-board vehicle electronic computer systems firmware to reset the detected fault.

2. The computer-implemented method of claim 1, wherein the attributes of the vehicle comprise one of a year of the vehicle, a make of the vehicle, a model of the vehicle, a residual value of the vehicle, a mileage of the vehicle, a condition of the vehicle, and a combination thereof.

3. The computer-implemented method of claim 1, wherein the attributes of the recommended aftermarket part comprise a cost of the recommended part, a quality of the recommended aftermarket part, a function of the recommended aftermarket part, and a combination thereof.

4. The computer-implemented method of claim 1, further comprising sorting one of the plurality of parts, the subset of parts compatible with the vehicle, and a combination thereof, based on one or more sorting factors.

5. The computer-implemented method of claim 4, wherein the one or more sorting factors comprise one of an age of the vehicle, a condition of vehicle, an anticipated service life of the vehicle, and a combination thereof.

6. The computer-implemented method of claim 1, further comprising receiving a selection of a selected part corresponding to the at least one recommended part, wherein the weighting factor is adjusted to deemphasize remaining parts of the subset of parts compatible with the vehicle that are not selected relative to the at least one recommended aftermarket part for the subsequent recommendation.

7. The computer-implemented method of claim 1, further comprising receiving a selection of a selected part corresponding to the at least one recommended aftermarket part, wherein the weighting factor is adjusted to emphasize the at least one recommended aftermarket part relative to remaining parts of the subset of parts compatible with the vehicle for the subsequent recommendation.

8. The computer-implemented method of claim 1, comprising:
    receiving login credentials associated with a user;
    filtering the plurality of parts, the subset of parts compatible with the vehicle, or both, based on stored preferences associated with the user; and
    wherein the stored preferences comprise one of a manufacturer preference, a distributor preference, a price category, a purchase history, and a combination thereof.

9. The computer-implemented method of claim 1, wherein the vehicle identification information comprises one of a year of the vehicle, a make of the vehicle, a model of the vehicle, an origination point of the vehicle, and a combination thereof.

10. The computer-implemented method of claim 1, wherein the recommending the at least one aftermarket part from the subset of parts compatible with the vehicle is further based on one of a warranty status for the vehicle, age of the vehicle, a physical condition of the vehicle, a budget of a person associated with the vehicle, and a combination thereof.

11. The computer-implemented method of claim 1, further comprising:
processing a part order based on the at least one recommended part; and
generating part order data indicating a procurement of the at least one recommended part; and
wherein modifying the part recommendation rule set based on the at least one recommended aftermarket part from the subset of parts compatible with the vehicle comprises one of:
emphasizing the at least one recommended aftermarket part from the subset of parts relative to remaining parts from the subset of parts compatible with the vehicle based on the part order data for the subsequent recommendation; and
and deemphasizing the at least one recommended aftermarket part from the subset of parts relative to the remaining parts from the subset of parts compatible with the vehicle for the subsequent aftermarket recommendation.

12. The computer-implemented method of claim 11, wherein adjusting the weighting factor associated with the at least one recommended aftermarket part from the subset of parts compatible with the vehicle based on the modified rule set comprises one of increasing the weighting factor associated with the at least one recommended aftermarket part for the subsequent recommendation, if the at least one recommended part is emphasized, and, decreasing the weighting factor associated with the at least one recommended aftermarket part for the subsequent recommendation, if the at least one recommended aftermarket part is deemphasized.

13. The computer-implemented method of claim 12, wherein the part recommendation rule set is further modified based on recommendation trend data associated with the subset of parts compatible with the vehicle.

14. The computer-implemented method of claim 12, wherein the recommendation of the least one aftermarket part of the subset of parts compatible with the vehicle is further based on an estimated labor time and an associated maintenance cost for the vehicle.

15. The computer-implemented method of claim 1, further comprising:
processing a part order based on the at least one recommended aftermarket part; and
facilitating delivery of the at least one recommended aftermarket part in response to processing the part order.

16. The computer-implemented method of claim 1, further comprising:
interfacing a diagnostic interface device with an on-board diagnostic system of the vehicle; and
receiving, at the diagnostic interface device, the vehicle data, wherein the vehicle data is generated at least part by the on-board diagnostic system of the vehicle.

17. The computer-implemented method of claim 1, further comprising:
searching content of a plurality of webpages for the recommended aftermarket part based on search criteria; and
retrieving information for the recommend aftermarket part based on a result of the search.

18. The computer-implemented method of claim 17, wherein the plurality of webpages comprises one of webpages associated with OEMs, webpages associated with distributors, webpages associated with wholesalers, web pages associated with third party providers, and a combination thereof.

19. A system for recommending and procuring a part comprising:
a diagnostic interface device configured to interface with an on-board diagnostic system of a vehicle and configured to receive vehicle data, wherein the vehicle data is generated at least in-part by the on-board diagnostic system; and
a computing device comprising a memory to store machine readable instructions and one or more processors to access the memory and execute the machine readable instructions to:
receive a diagnostic code for a vehicle, wherein the diagnostic code associates with a detected fault condition of a vehicle to the aftermarket parts,
wherein the vehicle data comprises a vehicle identification number (VIN) for the vehicle;
search via a network, a diagnostic code database for maintenance information based on the diagnostic code;
query a parts database comprising parts data characterizing a plurality of parts compatible with a plurality of vehicles, wherein the parts data is provided from a plurality of data sources, and wherein the parts data comprises original equipment manufacturer (OEM) parts data and aftermarket parts data;
wherein the query comprises identifying a subset of parts of the plurality of parts compatible with the vehicle by comparing the detected fault condition and the VIN for the vehicle relative to vehicle identification information associated with the parts data;
recommend at least one aftermarket part from the subset of parts compatible with the vehicle based on the detected fault condition, the current operating condition, the maintenance information and a weighting factor associated with the at least one recommended aftermarket part;
modify a part recommendation rule set in response to the at least one recommended aftermarket part from the subset of parts compatible with the vehicle;
adjust the weighting factor associated with the at least one recommended aftermarket part from the subset of parts compatible with the vehicle based on the modified part recommendation rule set;
transmit a subsequent recommendation of the at least one part from the subset of parts compatible with the detected fault condition and the vehicle based on the adjusted weighting factor after a subsequent query of the parts database;
request or procure a part order through the network, based on the at least one recommended aftermarket part to accomplish needed repairs in the vehicle; and
send after the needed repair, a reset signal through the diagnostic interface device to reset on-board vehicle electronic computer systems firmware to reset the detected fault.

20. The system of claim 19, wherein the diagnostic interface device interfaces with the on-board diagnostic system of the vehicle based on a given protocol.

* * * * *